US012784780B2

(12) United States Patent
Kolavennu et al.

(10) Patent No.: US 12,784,780 B2
(45) Date of Patent: *Nov. 3, 2026

(54) VIDEO REDACTION

(71) Applicant: U.S. Bank National Association, Minneapolis, MN (US)

(72) Inventors: Soumitri Naga Kolavennu, Plymouth, MN (US); Varshini Sriram, Menlo Park, CA (US); Priyanka Singhal, Atlanta, GA (US)

(73) Assignee: U.S. Bank National Association, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/307,738

(22) Filed: Aug. 22, 2025

(65) Prior Publication Data

US 2026/0051335 A1 Feb. 19, 2026

Related U.S. Application Data

(63) Continuation of application No. 19/187,632, filed on Apr. 23, 2025, now Pat. No. 12,424,247, which is a (Continued)

(51) Int. Cl.

*G11B 27/031* (2006.01)
*G06T 7/246* (2017.01)
(Continued)

(52) U.S. Cl.

CPC ............ *G11B 27/031* (2013.01); *G06T 7/246* (2017.01); *G06T 7/73* (2017.01); *G06V 10/225* (2022.01);

(Continued)

(58) Field of Classification Search

CPC ..... G11B 27/031; G11B 27/038; G06T 7/246; G06T 7/73; G06V 20/52; G06V 40/161; G06V 20/41; G06V 10/44; G06V 10/225

See application file for complete search history.

(56) References Cited

U.S. PATENT DOCUMENTS 11,152,032 B2 * 10/2021 Ding .......................... G06T 7/97
2018/0107830 A1 4/2018 Bobbitt et al.

(Continued)

FOREIGN PATENT DOCUMENTS

WO 2022/104484 5/2022

OTHER PUBLICATIONS

PCT International Search Report and Written Opinion in Application PCT/US2024/038868, mailed Oct. 10, 2024, 16 pages.

(Continued)

*Primary Examiner* — Mishawn N. Hunter

(74) *Attorney, Agent, or Firm* — Merchant & Gould P.C.

(57) ABSTRACT

Aspects of the embodiments described herein are related to systems, methods, and computer products for forming a redacted video. A video is processed to detect one or more subjects present within the video. From the detected subjects, a subject to be redacted is determined. Bounding regions are determined for the subject in each frame in which the subject is present. Determining the bounding regions includes calculating uncertainty values related to the level of uncertainty regarding the subject's position and adjusting the size of the bounding regions based on the uncertainty values. A redacted video is then formed by redacting the subject from the video using the bounding regions.

20 Claims, 7 Drawing Sheets

Related U.S. Application Data continuation of application No. 18/364,954, filed on Aug. 3, 2023, now Pat. No. 12,315,535.

(51) Int. Cl.

| | |
|---|---|
| ***G06T 7/73*** | (2017.01) |
| ***G06V 10/22*** | (2022.01) |
| ***G06V 10/44*** | (2022.01) |
| ***G06V 20/40*** | (2022.01) |
| ***G06V 20/52*** | (2022.01) |
| ***G06V 40/16*** | (2022.01) |

(52) U.S. Cl.

CPC .............. *G06V 10/44* (2022.01); *G06V 20/41* (2022.01); *G06V 20/52* (2022.01); *G06V 40/161* (2022.01); *G06T 2200/24* (2013.01); *G06T 2207/10016* (2013.01); *G06T 2207/20092* (2013.01); *G06T 2207/30201* (2013.01); *G06T 2207/30232* (2013.01)

(56) References Cited

U.S. PATENT DOCUMENTS

| | | | |
|---|---|---|---|
| 2018/0137892 A1 | 5/2018 | Ding | |
| 2018/0189505 A1 | 7/2018 | Ghafourifar | |
| 2018/0268240 A1 | 9/2018 | Loce et al. | |
| 2019/0138748 A1 | 5/2019 | Long et al. | |
| 2019/0373210 A1 | 12/2019 | Nguyen | |
| 2020/0143838 A1 | 5/2020 | Peleg et al. | |
| 2020/0151441 A1 | 5/2020 | Doumbouya | |
| 2020/0381018 A1 | 12/2020 | Pham et al. | |
| 2021/0035342 A1 | 2/2021 | Glaser et al. | |
| 2021/0218906 A1 | 7/2021 | Michaud et al. | |
| 2022/0164180 A1 | 5/2022 | Chorley et al. | |
| 2023/0039454 A1 * | 2/2023 | Wang ................. | G05B 19/4184 |
| 2025/0046343 A1 | 2/2025 | Kolavennu | |

OTHER PUBLICATIONS

Daedalus, “Object Tracking: Techniques, Challenges, and Real-World Applications—Part 1”, May 18, 2023, located online on Linkedin at: https://www.linkedin.com/pulse/exploring-multi-camera-multi-object-tracking-techniques, 11 pages.

Petrovicheva, Anna, “Multiple Object Tracking in Realtime”, Oct. 27, 2020, OpenCV, located online at: https://opencv.org/blog/2020/10/27/multiple-object-tracking-in-realtime/, 7 pages.

Shagan Sah et al., “Video Redaction: A Survey and Comparison of Enabling Technologies”, Journal of Electronic Imaging, vol. 26, No. 5, Jul. 20, 2017, 15 pages.

Zhou, Jizhe et al., “Privacy-sensitive Objects Pixelation for Live Video Streaming”, Poster Session E2: Emotional and Social Signals in Multimedia & Media Interpretation, MM ’20, Oct. 12-16, 2020, Seattle, WA, USA, 9 pages.

* cited by examiner

VIDEO REDACTION

CROSS REFERENCE TO RELATED APPLICATIONS

This application claims priority to and is a Continuation of U.S. patent application Ser. No. 19/187,632, filed Apr. 23, 2025, which is a continuation U.S. patent application Ser. No. 18/364,954, filed Aug. 3, 2023, now U.S. Pat. No. 12,315,535, issued on May 27, 2025, which are hereby incorporated by reference in their entirety.

FIELD OF THE DISCLOSURE

Examples described herein generally relate to systems and methods for video redaction.

BACKGROUND

Video surveillance footage often contains identifying images of people. These identifying images can qualify as personal data in certain jurisdictions. Personal data can be subject to protection laws and regulations, such as the General Data Protection Regulation (GDPR) of the European Union. Individuals may request access to footage that includes their personal data. For example, an individual may submit a subject access request in the European Union to access footage that includes their personal data. The request can permit an individual to receive a copy of all personal data that a company has collected associated with the individual.

SUMMARY

Figure 1:
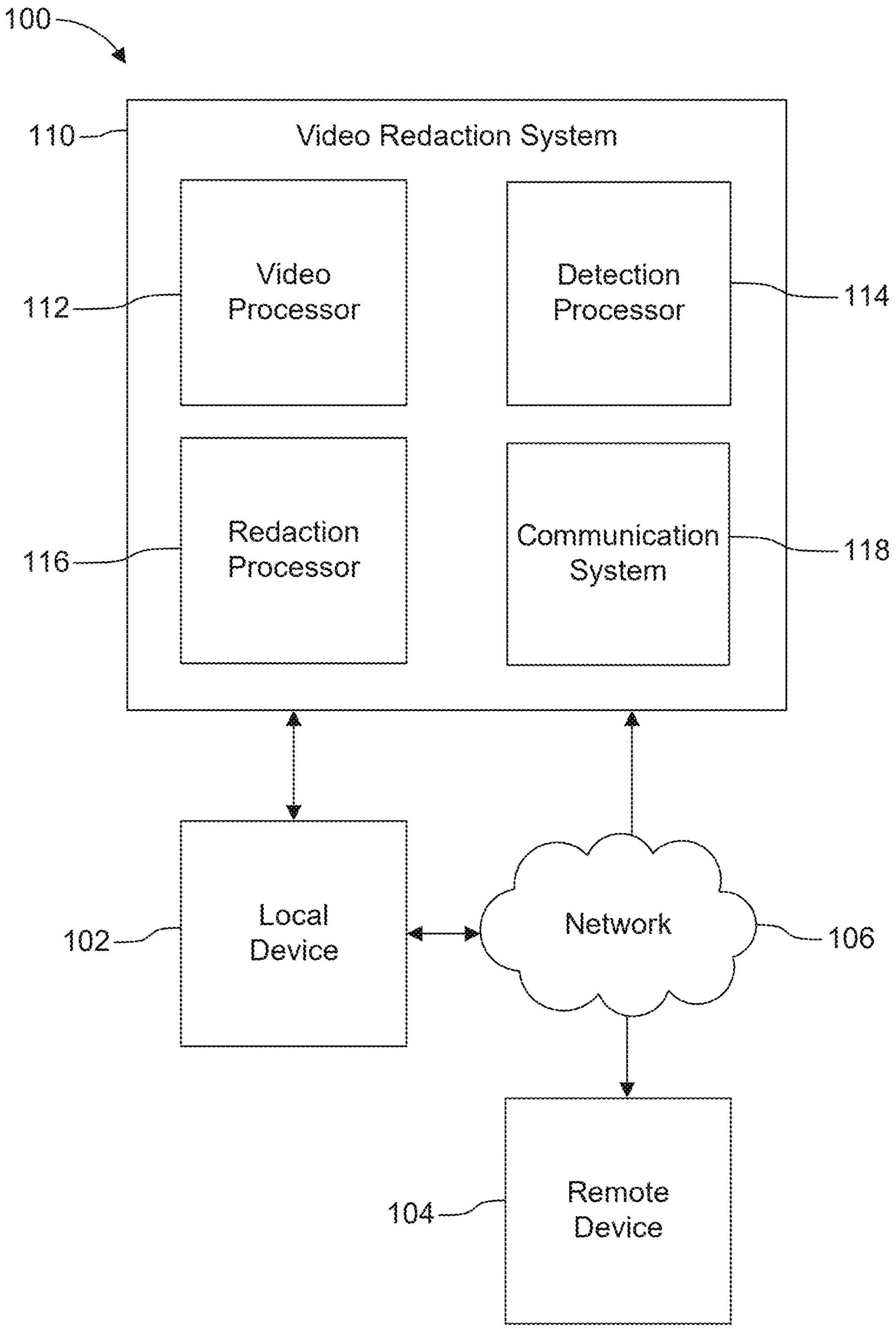
FIG. 1 illustrates an operating environment for providing a video redaction system, according to an example embodiment.

Aspects of the embodiments described herein are related to systems, methods, and computer products for performing video redaction and, particularly, to video redaction of selected people in the video. Aspects of the embodiments described herein are related to systems, methods, and computer products for performing computer-aided the redaction of identifying images in a video automatically. Aspects of embodiments described herein also provide artificial intelligence systems and methods that redact identifying images in a video similar to, but more efficiently and more accurately than the human mind. The video redaction system performs (i) object detection or segmentation, (ii) display of detected objects in a user interface for a user to select which objects to redact, (iii) object tracking through frames of the video, and (iv) redaction of selected objects in each frame of the video.

In one aspect, a method comprises receiving a request for personal information from a requestor; maintaining, as part of a security system, an original video showing the requestor; converting the original video into a plurality of frames; for each of the frames, detecting that a plurality of people are present in at least one of the plurality of frames; determining bounding regions for each person of the plurality of people in each frame; associating each bounding region with a respective person of the plurality of people; receiving a selection to redact the requestor; replacing pixels within the bounding region of the requestor with replacement pixels; converting the plurality of frames into a redacted video; providing the redacted video to the requestor in at least partial fulfillment of the request; and continuing to maintain, as part of the security system, the original video showing the requestor after providing the redacted video to the requestor. Receiving the selection to redact the requestor can include for each detected person, determining an icon identifying the detected person; and providing an interface comprising one or more selectable inputs, wherein each selectable input: includes one of the icons identifying the plurality of people, and is selectable to redact or keep the detected person, identified by the icon associated with the selectable input, in the redacted video, wherein the selection is a selection of the requestor. Determining the icon identifying the detected person can comprise: determining an identifying frame of the plurality of frames that includes a face of the detected person; and determining a portion of the identifying frame to be the icon, the portion including the face of the detected person. The method can further comprise determining an uncertainty value for the bounding regions, wherein the uncertainty value indicates a level of certainty of a position of the respective person associated with the bounding region; and sizing or resizing the bounding region based on the uncertainty value. The replacement pixels may convey encrypted data. The method may further comprise determining idle pixels from a background of the frames, wherein the replacement pixels comprise the idle pixels. Associating each bounding region with the respective person can comprise comparing positions of the bounding regions in the frames with positions of the bounding regions in subsequent frames. Associating each bounding region with the respective person can comprise determining expected velocities of the plurality of people; determining expected positions of the plurality of people based on the expected velocities; and comparing the expected positions to positions of the bounding regions. Associating each bounding region with the respective person can comprise determining an identifying feature of one or more of the plurality of people. Associating each bounding region with the respective person can comprise any one of (i) comparing distances of bounding regions between frames, (ii) comparing expected positions of the plurality of people with positions of bounding regions, (iii) determining identifying features of the plurality of people, or (iv) any combination of (i), (ii), and (iii). The method can further comprise inserting a last bounding region at a last known position of one of the plurality of people for a predetermined number of subsequent frames when the detected person cannot be found in the predetermined number of subsequent frames. The method can further comprise receiving an additional video; converting the additional video into a plurality of additional frames; and time synchronizing the plurality of frames and the plurality of additional frames, wherein any one of (i) determining bounding regions, (ii) tagging the plurality of people, (iii) tracking the plurality of people, or (iv) any combination of (i), (ii), and (iii), is based on the plurality of additional frames. Associating each bounding region with the respective person can comprise for each frame one or more of the plurality of people first appear, tagging a corresponding bounding region of the one or more of the plurality of people that first appear with an identifier; and tracking the plurality of people in subsequent frames and tagging bounding regions corresponding with the respective person with the corresponding identifier in each frame.

In another aspect, there may be a non-transitory computer-readable medium having stored thereon one or more sequences of instructions for causing one or more processors to perform: receiving a video; converting the video into a plurality of frames; for each of the frames, detecting if one or more people are present in at least one of the plurality of frames; determining bounding regions for the detected people in each frame; for each frame one or more detected people first appear, tagging a corresponding bounding region of the one or more detected people that first appear with an identifier; tracking the detected people in subsequent frames and tagging the bounding regions corresponding with the detected person with the corresponding identifier in each frame; for each detected person, determining an icon identifying the detected person; displaying an interface comprising one or more selectable inputs, wherein each selectable input: includes one of the icons identifying the detected people, and is selectable to redact or keep the detected person, identified by the icon associated with the selectable input, in the video; receiving a selection to redact a selected person; filling the bounding regions of the selected person with replacement pixels; and converting the plurality of frames into a new video. The one or more sequences of instructions can further cause the one or more processors to perform determining uncertainty values for the bounding regions, wherein the uncertainty values indicate a level of certainty of positions of persons associated with the bounding regions; and sizing the bounding regions based on the uncertainty values. Determining the icons identifying the detected persons comprises determining an identifying frame of the plurality of frames that includes a face of the detected persons; and determining a portion of the identifying frame to be the icon, the portion including the face of the detected persons. The one or more sequences of instructions can further cause the one or more processors to perform receiving an additional video; converting the additional video into a plurality of additional frames; and time synchronizing the plurality of frames and the plurality of additional frames, wherein any one of (i) determining bounding regions, (ii) tagging detected people, (iii) tracking detected people, or (iv) any combination of (i), (ii), and (iii), is based on the plurality of additional frames. Tracking the detected people in subsequent frames and tagging the bounding regions corresponding with the detected person with the corresponding identifier in each frame can comprise comparing positions of the bounding regions in the frames with positions of the bounding regions in subsequent frames. Tracking the detected people in subsequent frames and tagging the bounding regions corresponding with the detected person with the corresponding identifier in each frame can comprise any one of (i) comparing distances of bounding regions between frames, (ii) comparing expected positions of detected people with positions of bounding regions, (iii) determining identifying features of the detected people, or (iv) any combination of (i), (ii), and (iii).

DETAILED DESCRIPTION

To protect the privacy of others in a video surveillance scene, non-requesting individuals can be removed or anonymized before allowing the requesting individual access to the footage. Removing or anonymizing the footage includes redacting any identifying images of people that are not the requesting party. Use of video editing tools to manually redact identifying images of people for each frame of the relevant footage can be time and resource intensive and inaccurate. Therefore, what is needed is a system and method for automated redaction of identifying images of third parties in a video. Such automatic redaction of content in video surveillance is counterintuitive because the primary purpose of surveillance footage is to provide an accurate depiction of a scene.

FIG. 1 illustrates an operating environment 100 for providing a video redaction system, according to an example embodiment. The illustrated operating environment 100 includes a local device 102, a remote device 104, a network 106, and a video redaction system 110. The local device 102 is local to the video redaction system 110. The remote device 104 is remote from the video redaction system 110. The devices can communicate with each other directly or indirectly (e.g., via the network 106) through wireless or wired connections.

The local device 102 and the remote device 104 are any device that a user can operate to capture videos, upload videos, select detected objects for redaction, and/or receive redacted videos. In an example, the local device 102 or the remote device 104 are video surveillance cameras facing a public or semi-public location (e.g., the lobby of a financial institution). Although illustrated as separate components, the video redaction system 110 (or portions thereof) can be part of or otherwise executed by one or both of the local device 102 or the remote device 104. Thus, the video redaction system 110 may be a user device such as a server, personal computer, a smartphone, a tablet, other computing device, or combinations thereof.

In the illustrated example, the video redaction system 110 includes a video processor 112, a detection processor 114, a redaction processor 116, and a communication system 118. The processors 112, 114, 116 can take any of a variety of forms to implement aspects described herein. In some examples, the video redaction system 110 can be a general-purpose computing device having one or more processors executing instructions stored in memory to cause the one or more processors to become specialized processors (e.g., one or more specific video processors 112, detection processors 114, or redaction processors 116). In addition or instead, the processors can be or include special purpose hardware circuits configured to perform certain operations. In some instances, the circuit can include video processing, encoding, or decoding circuits to accelerate processing of video contend.

The video processor 112 can process videos received and/or stored by the video redaction system 110. For example, the video processor 112 converts videos into a plurality of sequential frames. Thus, the video is converted into a group of ordered frames. For instance, the video processor 112 can be formed by executing video instructions on one or more processors. The video instructions can define a method that include operations, such as loading a video from memory, generating frames from the video, and storing the frames in memory or sending the frames to another process.

The detection processor 114 can detect objects in video frames, tag or otherwise assign a unique identifier to each detected object, and track detected objects. For instance, the detection processor 114 can be formed by executing detection instructions on one or more processors. The detection instructions can, for example, implement machine learning techniques to detect objects in the frames. For example, an object detection models such as a single-shot detector trained with an object detection data set (e.g., trained to detect people) can be used to detect objects of interest. A single-shot detector may use a convolutional neural network to predict bounding boxes and class labels for objects in an image. In some embodiments, the objects of interest are people present in the frames. For example, the detection processor 114 detects people in the video frames obtained by the video processor 112, tags the detected people, and tracks the movement of the detected people in each frame. In further embodiments, the detection processor 114 detects people and/or other objects of interest that a user may wish to redact (e.g., personal information, license plates, text, etc.).

The detection processor 114 can be configured to identify entry frames and exit frames. An entry frame, as used herein, is the first frame of a series of frames in which an object of interest is detected. An exit frame, as used herein, is the last frame of the series of frames in which the object of interest appears. For example, if the object of interest leaves the view of the video, the last frame in which the detected object was in (e.g., the prior frame), is the exit frame. An object may enter and/or exit the view of a video multiple times, and the detection processor 114 can identify each entry and/or exit frame associated with the object entering and/or exiting the view of the video. In some embodiments, the tag or otherwise unique identifier identifies the entries and/or exits from the video frames for a detected object. The detection processor 114 may evaluate a number of previous frames (e.g., up to twenty previous frames) when an object is detected as entering the video to confirm that the identified frame is the first frame the object is detected.

In addition or instead, the detection processor 114 can determine bounding regions (e.g., bounding boxes, bounding rectangles, bounding curves, bounding blobs, or bounding polygons) to encapsulate the detected object in each frame (e.g., an entirety or portion thereof). When the detection processor 114 determines bounding regions that cover the object (e.g., determining bounding regions that encapsulate the entire body of each person present), the detection processor 114 can assign an uncertainty value to each bounding region in each frame based on a calculated certainty of the position and/or size of the object associated with the bounding region. The detection processor 114 can use uncertainty values to increase or decrease the size of bounding regions to ensure that the bounding regions surround the objects, such as the entire body of a person.

The detection processor 114 can be configured to track the objects in the frames using identifying features of the object (e.g., the clothes a person is wearing), determining the expected position and velocity of the object based on the position of the object in previous frames (e.g., comparing the position and/or motion of the detected object in previous frames), and/or the like.

In certain embodiments, the detection processor 114 uses the expected position to determine where to search for objects or matching objects. For example, an average (or other useful calculation) movement of a centroid of an object over several frames is M, pixels in the x direction and Ny pixels in the y direction. Then, to determine where the object is in a subsequent frame, the detection processor 114 can begin its search (or weight its search results) toward objects N, pixels in the x direction and Ny pixels in the y direction.

In certain embodiments, the detection processor 114 determines the distances of bounding regions, including the centroids and the corners of the bounding regions, in subsequent frames and determines an object is the same object as one identified in a previous frame based on determining the bounding regions in the two frames with the shortest overall distance. The detection processor 114 determines the overall distance by determining the distance between the centroids of the bounding regions and the distances between the respective corners of the bounding regions. The detection processor 114 can manage complications such as occlusions (e.g., multiple objects crossing paths, detected object moving behind objects or otherwise being obscured from the view of the video, entrances and exits in the field of view, etc.) and people entering or leaving the field of view by tagging a person that is not known to be the same person due to the complications as a new person, using the field of view of another camera, using identifying features of the person to reestablish the identity, and/or the like.

In certain instances, expected position or minimum distance may fail to detect the correct object (e.g., instances where object's bounding regions or other representations overlap or cross in a frame or scene). Thus, it may be beneficial for expected position or minimum distance or expected position to be one factor among several in determining which object corresponds to which or should be redacted. Other factors may include visual characteristics of the object that are detectable across scenes (e.g., clothing style or color).

In some embodiments, the detection processor 114 may not detect a tracked object in one or more subsequent frames after a frame the tracked object was in. The detection processor 114 can create a bounding region in the one or more subsequent frames at the last location the tracked object was identified to ensure that the tracked object will be redacted in every frame the tracked object is present in. The detection processor 114 can tag the created bounding regions to be associated with the tracked object that may or may not be present in these subsequent frames. The detection processor 114 can also adjust the position of the bounding regions in the subsequent frames based on the expected position and expected velocity of the detected object determined using frames the object was detected in.

The redaction processor 116 can be configured to redact a detected object (e.g., a person) by replacing pixels in the bounding regions associated with the detected object. The redaction processor 116 can use the identified entry frames and exit frames associated with an object to be redacted to determine which frames to process and uses the bounding regions determined by the detection processor 114 to perform the redaction in the frames. The redaction processor 116 may perform redaction by replacing pixels in a bounding region with black pixels or with idle pixels (e.g., background pixels at the location when no activity is detected). The redaction processor 116 can determine idle pixels by evaluating pixels of the location of the bounding region in frames where there is no object at the location (e.g., by selecting frames from a time when it is known that no one is present in the area or based on manual identification of such pixels by a human operator). In some examples, idle pixels are determined by averaging (e.g., calculating mean or median) the values of pixels from across many frames. In this way, because active objects tend to be transient (e.g., occupy the area for a relatively short period of time), they will be outweighed in the averaging by the idle pixels. Thus, the redaction processor 116 determines pixels that display the background of the view of the video using the other frames, and replacing the pixels with idle pixels makes the frame appear to not have the object being redacted included in the frame and just the background of the view. When the redaction processor 116 redacts each detected object that should be redacted in the frames, the video processor 112 can convert the frames with the redactions into a new video.

The communication system 118 is a set of one or more components configured to enables the video redaction system 110 to communicate with one or more other devices. The communication system 118 can communicate with devices using wired (e.g., Ethernet) and wireless communications techniques such as short-range wireless technology, cellular technology, wireless networks, etc. The communication system 118 can communicate with the local device 102, the remote device 104 via the network 106, and/or additional devices. The communication system 118 can receive videos for redaction, send videos that include redactions, send information for allowing the selection of objects to be redacted, and receive selections of objects to be redacted.

Once each object is identified, tagged, and tracked, the video redaction system 110 can be configured to provide a user interface with selectable inputs that allow a user to select which objects to redact and which objects to keep. The detection processor 114 determines icons identifying detected objects, and the communication system 118 can send the icons to the local device 102 and/or the remote device 104. For example, the detection processor 114 may determine a frame where a detected person's face is visible and create the icon for the detected person using the frame with the detected person's face. In another example, a detected person's face may not be visible or difficult to distinguish, and the detection processor 114 may determine a frame where the person is not obstructed or least obstructed to create an icon identifying the detected person. The detection processor 114 can determine a portion of the frame to use as the icon, for example using the bounding region associated with the detected object the detection processor 114 is creating the icon for. The communication system 118 can cause the icons to be displayed as selectable inputs via the local device 102 and/or the remote device 104 to allow a user to select which detected objects to keep and which detected objects to redact in the new video. In some embodiments, the video redaction system 110 displays the icons and then receives a selection of one or more of the icons identifying which objects to keep and/or which objects to redact.

While many examples above-described redacting people within a bounding region, in other examples, everything outside of a bounding region may be redacted. For instance, everything within a bounding region of interest may remain as-is and everything outside of the bounding region may be modified, such as by modifying a brightness, contrast, color, noise, sharpness, or other characteristics. Everything outside the bounding region may be painted with a particular color or pattern. Everything outside the bounding region may be cropped out.

Figure 2:
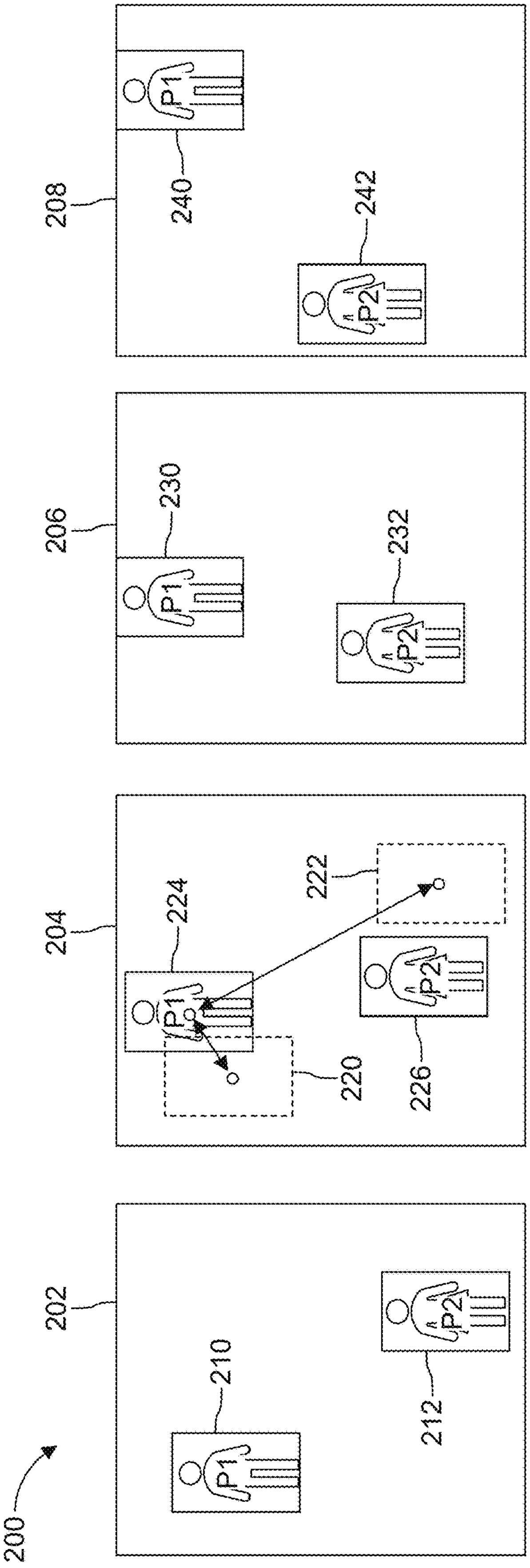
FIG. 2 illustrates example video frames for the video redaction system to detect objects, according to an example embodiment.

FIG. 2 illustrates example video frames 200 for the video redaction system 110 to detect objects, according to an example embodiment. The example video frames 200 includes a first frame 202, a second frame 204, a third frame 206, and a fourth frame 208. The second frame 204 is the next frame sequentially after the first frame 202, the third frame 206 is the next frame sequentially after the second frame 204, and the fourth frame 208 is the next frame sequentially after the third frame 206.

The first frame 202 includes a first bounding region 210 and a second bounding region 212. The detection processor 114 identifies a first person P1 and creates the first bounding region 210 sized to cover the entire body of the first person P1. Similarly, the detection processor 114 identifies a second person P2 and creates the second bounding region 212 sized to cover the entire body of the second person P2. The detection processor 114 also creates a tag for the first person P1 and assigns the tag to the first bounding region 210 and creates a tag for the second person P2 and assigns the tag to the second bounding region 212. In an example, the first frame 202 is an entry frame for the first person P1 or the second person P2. The detection processor 114 can store or otherwise assign the first frame 202 as an entry frame to the person P1 and the second person P2.

The second frame 204 includes a position of the first bounding region 220, a position of the second bounding region 222, a third bounding region 224, and a fourth bounding region 226. The detection processor 114 sizes the third bounding region 224 and the fourth bounding region 226 to cover the entirety of the respective detected objects. In some embodiments, the detection processor 114 compares the position of the first bounding region 220 and the position of the second bounding region 222 to the positions of the third bounding region 224 and the fourth bounding region 226 to determine person associated the third bounding region 224 and the fourth bounding region 226. The distance between the position of the first bounding region 220 and the third bounding region 224 is less than the distance between the position of the second bounding region 222 and the third bounding region 224, so the detection processor 114 determines that the third bounding region 224 is associated with the first person P1. Similarly, the detection processor 114 determines the fourth bounding region 226 is associated with the second person P2 because of the distance between the position of the first bounding region 220 and the fourth bounding region 226 and the distance between the position of the second bounding region 222 and the fourth bounding region 226. Once, the detection processor 114 determines the third bounding region 224 is associated with the first person P1 and the fourth bounding region 226 is associated with the fourth bounding region 226, the detection processor 114 tags the third bounding region 224 with the tag associated with the first person P1 and the fourth bounding region 2256 with the tag associated with the second person P2.

The third frame 206 includes a fifth bounding region 230 and a sixth bounding region 232. The detection processor 114 determines the fifth bounding region 230 is associated with the first person P1 (e.g., based on the distance between the fifth bounding region 230 and the third bounding region 224, the distance between the fifth bounding region 230 and the fourth bounding region 226, the distance between the fifth bounding region 230 and the first bounding region 210, and/or the distance between the fifth bounding region 230 and the second bounding region 212) and tags the fifth bounding region 230 with the tag associated with the first person P1. The detection processor 114 determines the sixth bounding region 232 is associated with the second person P2 and tags the sixth bounding region 232 with the tag associated with the second person P2.

The fourth frame 208 includes a seventh bounding region 240 and an eighth bounding region 242. The detection processor 114 again determines the objects associated with the bounding regions, determining the seventh bounding region 240 is associated with the first person P1 and the eighth bounding region 242 is associated with the second person P2. The detection processor 114 can then tag the seventh bounding region 240 with the tag associated with the first person P1 and tag the eighth bounding region 242 with the tag associated with the second person P2. Therefore, the first frame 202, the second frame 204, the third frame 206, and the fourth frame 208 all have bounding regions with tags to identify which bounding regions are associated with the first person P1 and which bounding regions are associated with the second person P2. If the redaction processor 116 is instructed to redact the first person P1 (e.g., by a selection of an icon identifying the first person P1), the redaction processor 116 will identify that the first bounding region 210, the third bounding region 224, the fifth bounding region 230, and the seventh bounding region 240 are tagged as associated with the first person P1, and the redaction processor 116 will redact the first person P1 by replacing the pixels of the first bounding region 210, the third bounding region 224, the fifth bounding region 230, and the seventh bounding region 240. Similarly, if the redaction processor 116 is instructed to redact the second person P2, the redaction processor 116 will identify that the second bounding region 212, the fourth bounding region 226, the sixth bounding region 232, and the eighth bounding region 242 are tagged as associated with the second person P2, and the redaction processor 116 will redact the second person P2 by replacing the pixels of the second bounding region 212, the fourth bounding region 226, the sixth bounding region 232, and the eighth bounding region 242.

Figure 3:
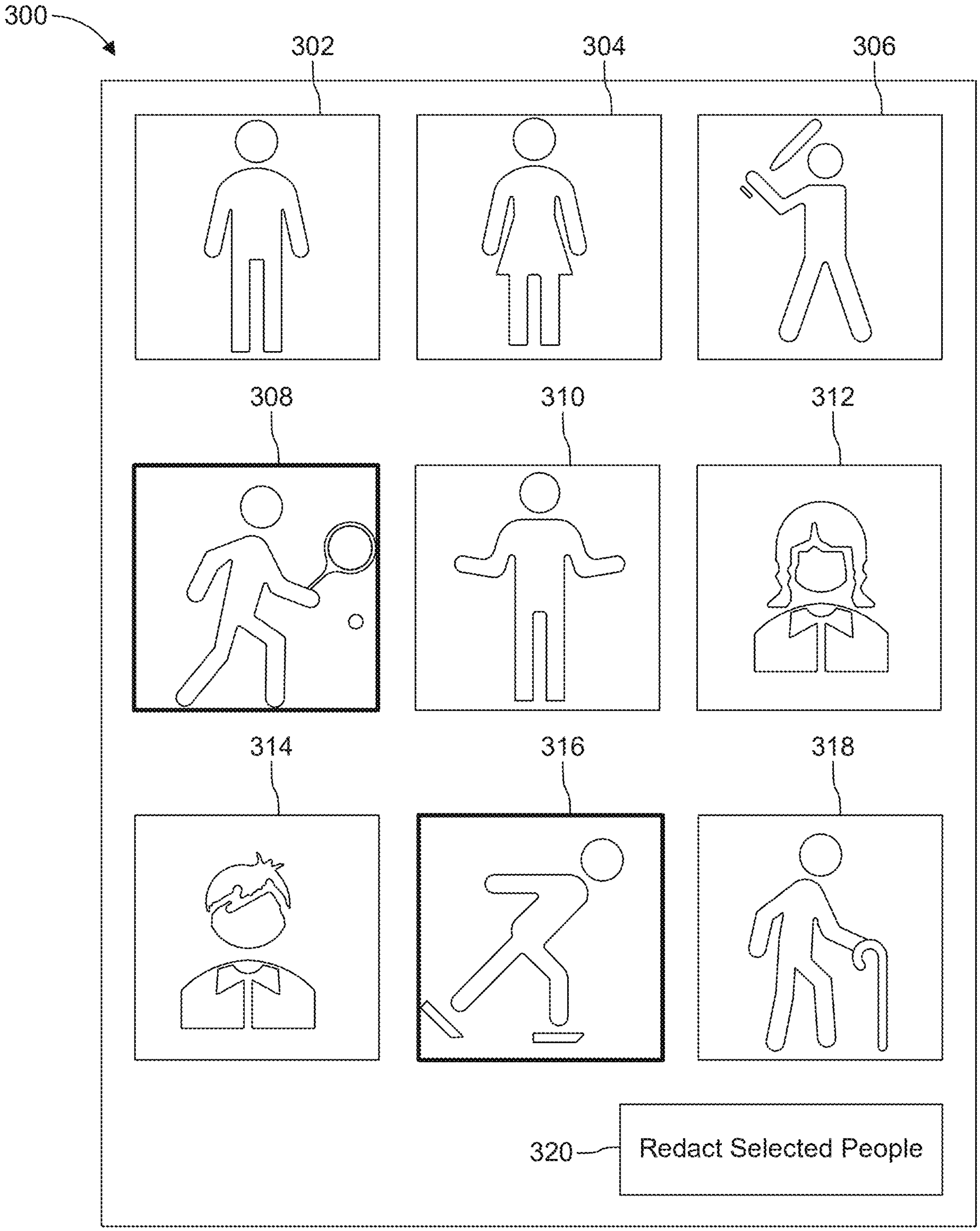
FIG. 3 illustrates a user interface for selecting people to keep and redact in a video, according to an example embodiment.

FIG. 3 illustrates a user interface 300 for selecting people to keep and redact in a video, according to an example embodiment. The video redaction system 110 can display the user interface 300 and/or cause the local device 102 or the remote device 104 to display the user interface 300. The user interface 300 includes a first icon 302, a second icon 304, a third icon 306, a fourth icon 308, a fifth icon 310, a sixth icon 312, a seventh icon 314, an eighth icon 316, a ninth icon 318, and a redaction button 320, and the icons all identify or are otherwise associated with a detected person in a video. For example, the first icon 302 is associated with the first person P1, and the second icon 304 is associated with the second person P2.

Each icon is selectable to keep or redact the person associated with the icon. For example, a user may select the first icon 302 to cause the video redaction system 110 to redact the first person P1 from the new video and/or select the second icon 304 to cause the video redaction system 110 to redact the second person P2 from the new video. The user interface 300 can display an emphasis to indicate which icons are currently selected. The user interface 300 shows the fourth icon 308 and the eighth icon 316 as emphasized, indicating that the person associated with the fourth icon 308 and the person associated with the eighth icon 316 are currently selected to be redacted. Once the user has made the icon selections, the user can select the redaction button 320 to cause the video redaction system 110 to redact the people associated with the selected icons and generate the new video with the redactions. The redaction processor 116 will identify frames the selected people are present in (e.g., using the entry frames and/or exit frames associated with the selected people) and redact the selected people (e.g., using the bounding regions associated with the selected people). The video processor 112 will then convert the frames including the redactions back into a video format.

In some examples, the icons are static images. In other instances, the icons changing images or video clips corresponding to frames cropped to the bounding region of that person across the video. Such moving images can give the user a better sense of what that person was doing in those frames to better determine which people should or should not be redacted.

In some instances, the user interface 300 provides user interface elements for receiving instructions for how to redact different individuals. For instance, the user interface 300 can receive selections from a user indicating that the person should be redacted by: being painted a particular selectable color, being painted with a particular selectable pattern, being blurred out, having noise added, being encrypted, using other techniques, or combinations thereof.

In some instances, the user interface 300 provides user interface elements indicating a proposed tag for the person. For instance, the tag may be generated as described above and the user of the user interface 300 may modify the existing tags or provide new tags for the people.

Figure 4:
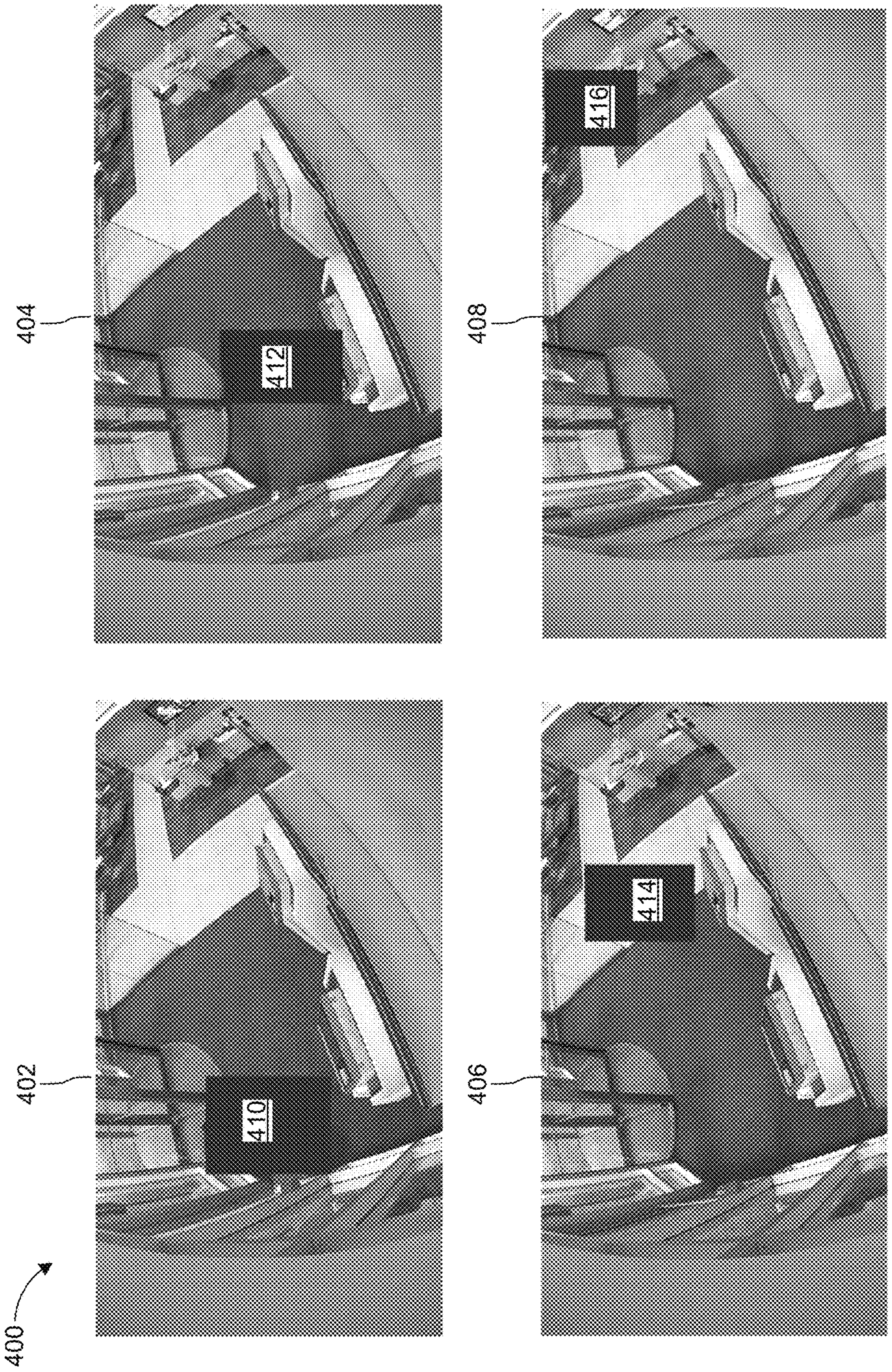
FIG. 4 illustrates video frames with bounding regions sized, according to an example embodiment.

FIG. 4 illustrates video frames 400 with bounding regions sized, according to an example embodiment. The additional example video frames 400 include a first video frame 402 a second video frame 404, a third video frame 406, and a fourth video frame 408. The first video frame 402 includes a first sized bounding region 410, the second video frame 404 includes a second sized bounding region 412, the third video frame 406 includes a third sized bounding region 414, and the fourth video frame 408 includes a fourth sized bounding region 416.

The detection processor 114 detects a person and determines an uncertainty value indicating the certainty that the detection processor 114 knows the position and size of the detected person. For example, the detection processor 114 determines the highest certainty value, indicating that the detection processor 114 is more certain of the position of the person, in the second video frame 404, the next highest uncertainty value in the first video frame 402, the next highest uncertainty value in the fourth video frame 408, and the lowest uncertainty value in the third video frame 406. Thus, the second sized bounding region 412 is smaller than the first sized bounding region 410 because of the higher uncertainty value associated with the second sized bounding region 412. The fourth sized bounding region 416 is smaller in size than the first sized bounding region 410 even though the first sized bounding region 410 is associated with a higher uncertainty value than the fourth sized bounding region 416, but the detected person is further from the view of the camera in the fourth video frame 408. Therefore, the fourth sized bounding region 416 is sized larger in proportion to the size of the detected person compared to the first sized bounding region 410, and the sizes of the bounding regions may not be directly correlated to the uncertainty value. The third sized bounding region 414 has the lowest certainty score and therefore the largest bounding region, the third sized bounding region 414, compared to the size of the person in the view of the video.

Figure 5:
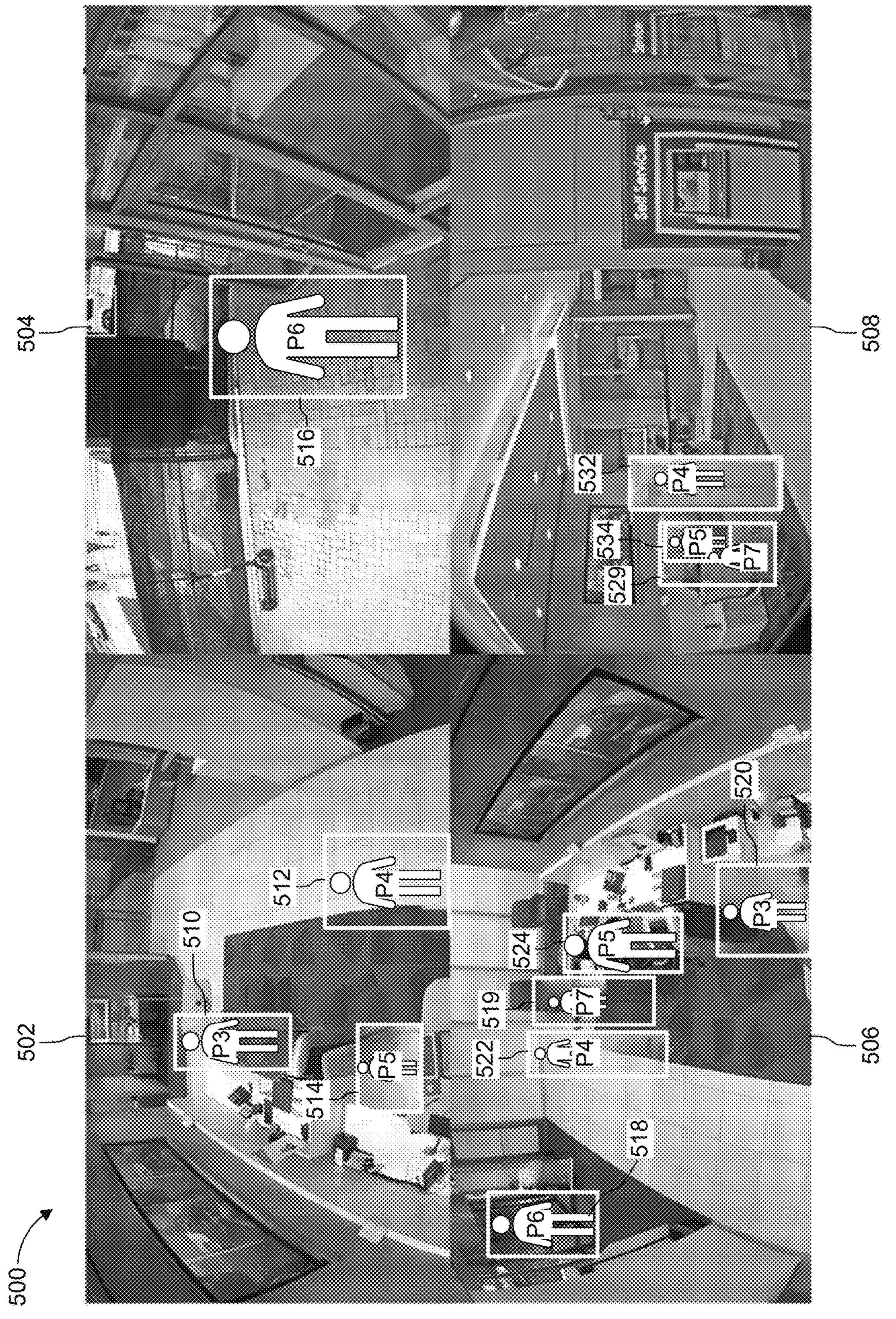
FIG. 5 illustrates an object detection of video frames of multiple cameras with unique points of view, according to an example embodiment.

FIG. 5 illustrates an object detection of video frames of multiple cameras with unique points of view 500, according to an example embodiment. The video frames of multiple cameras with unique points of view 500 include a first camera frame 502, a second camera frame 504, a third camera frame 506, and a fourth camera frame 508. The first camera frame 502, the second camera frame 504, the third camera frame 506, and the fourth camera frame 508 are time-synchronized frames showing different views of a building at the same time.

The first camera frame 502 is a view inside the building and includes a first P3 bounding region 510 associated with a third person P3, a first P4 bounding region 512 associated with a fourth person P4, and a first P5 bounding region associated with a fifth person P5. The second camera frame 504 has a view from the entrance outside the building and includes a P6 bounding region associated with a sixth person P6. If the third person P3, the fourth person P4, and/or the fifth person P5 exit the building, the person would enter the view of the second camera frame 504, and the video redaction system 110 could track the person as they go outside. Similarly, the sixth person P6 would enter the view of the first camera frame 502 if the sixth person P6 went into the building. The detection processor 114 can assign entry frames and exit frames to people when they enter and leave the view of each camera and/or only assign entry frames and exit frames to people when the person first enters the view of a camera or leaves the view of all cameras.

The third camera frame 506 includes a second P6 bounding region 518 associated with the sixth person P6, a first P7 bounding region 519 associated with a seventh person P7, a second P3 bounding region 520 associated with the third person P3, a second P4 bounding region 522 associated with the fourth person P4, and a second P5 bounding region 524 associated with the fifth person P5. The fourth camera frame 508 includes a second P7 bounding region 529 associated with the seventh person P7, a third P4 bounding region 532 associated with the fourth person P4, and a third P5 bounding region 534 associated with the fifth person P5.

The detection processor 114 can be configured detect and track each person using the different views provided by the multiple cameras. The detection processor 114 will also create bounding regions on each view and tag each bounding region with the associated person. The redaction processor 116 will redact selected persons in each camera view. For example, if the fourth person P4 is selected for redaction, the redaction processor 116 will redact the first P4 bounding region 512, the second P4 bounding region 522, and the third P4 bounding region 532.

In certain implementations, the cameras that produce the images can be calibrated such that the locations of the same object in different views can be used to determine a location of that object in three-dimensional space. This three-dimensional localization of the object of interest can enhance an ability of the system to track and redact the object as it moves. In an example, functions provided by OPENCV can be used to map coordinates in two-dimensional camera space to three-dimensional world space. By determining the location of the object in world space relative to the camera, the system can determine that the object is moving away from or towards a camera and therefore know to decrease or increase the size of the object as its apparent size changes.

Figure 6:
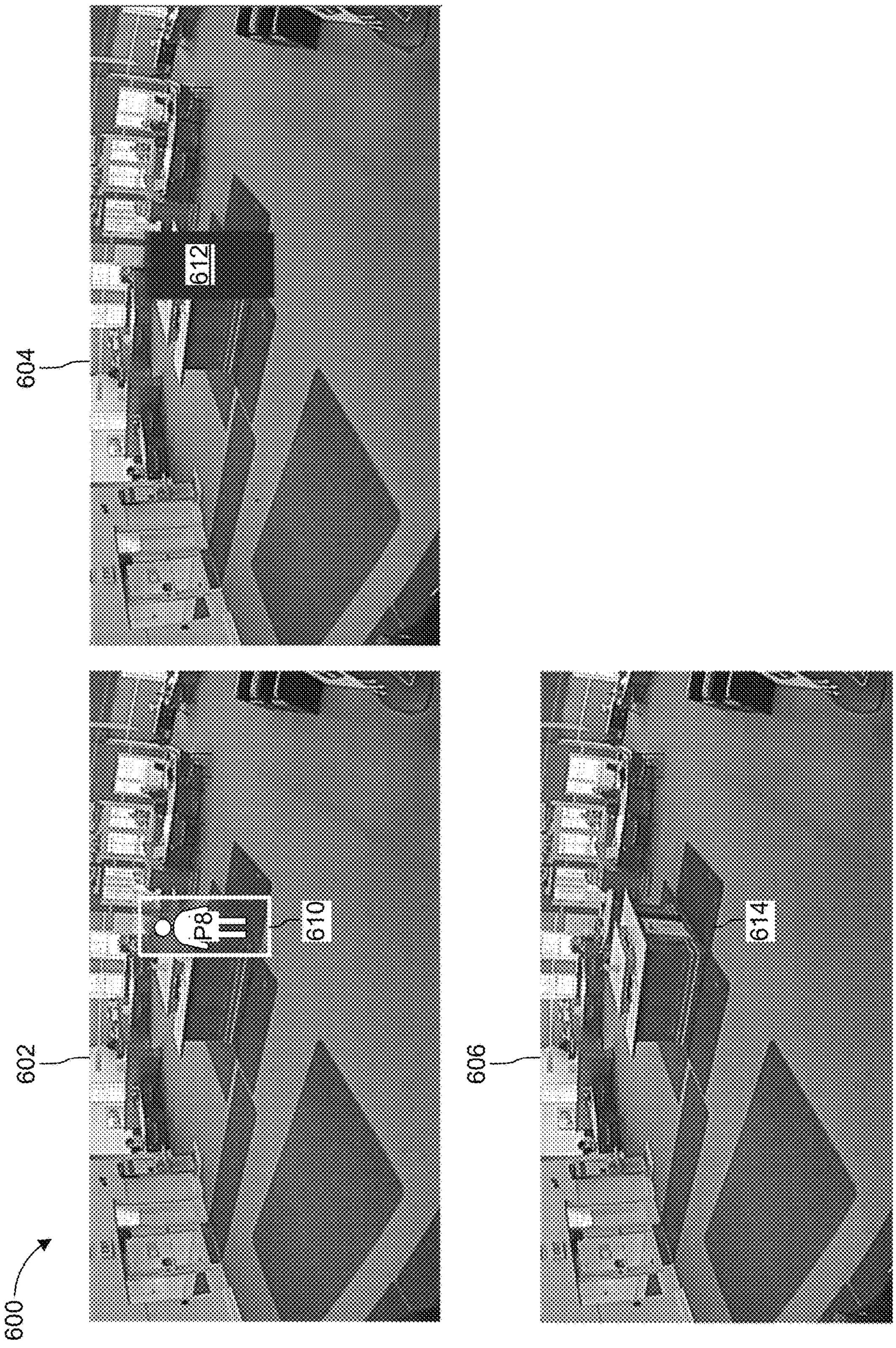
FIG. 6 illustrates video frames of redaction techniques, according to an example embodiment.

FIG. 6 illustrates video frames of redaction techniques 600, according to an example embodiment. The video frames of redaction techniques 600 includes an unredacted frame 602, a black pixel redacted frame 604, and an idle pixel redacted frame 606. The unredacted frame 602 includes an unredacted bounding region 610 encapsulating an eighth person P8, and the eighth person P8 is visible in the unredacted frame 602 because the redaction processor 116 has not redacted the person.

The black pixel redacted frame 604 includes a black pixel redacted bounding region 612. The eighth person P8 is not visible because the redaction processor 116 has replaced the pixels of the bounding region with black pixels. The idle pixel redacted frame 606 includes an idle pixel redacted bounding region 614. The eighth person P8 is not visible, and the video appears to have no object blocking the background in the location of the idle pixel redacted bounding region 614 because the redaction processor 116 has replaced the pixels of the bounding region with idle pixels.

Figure 7:
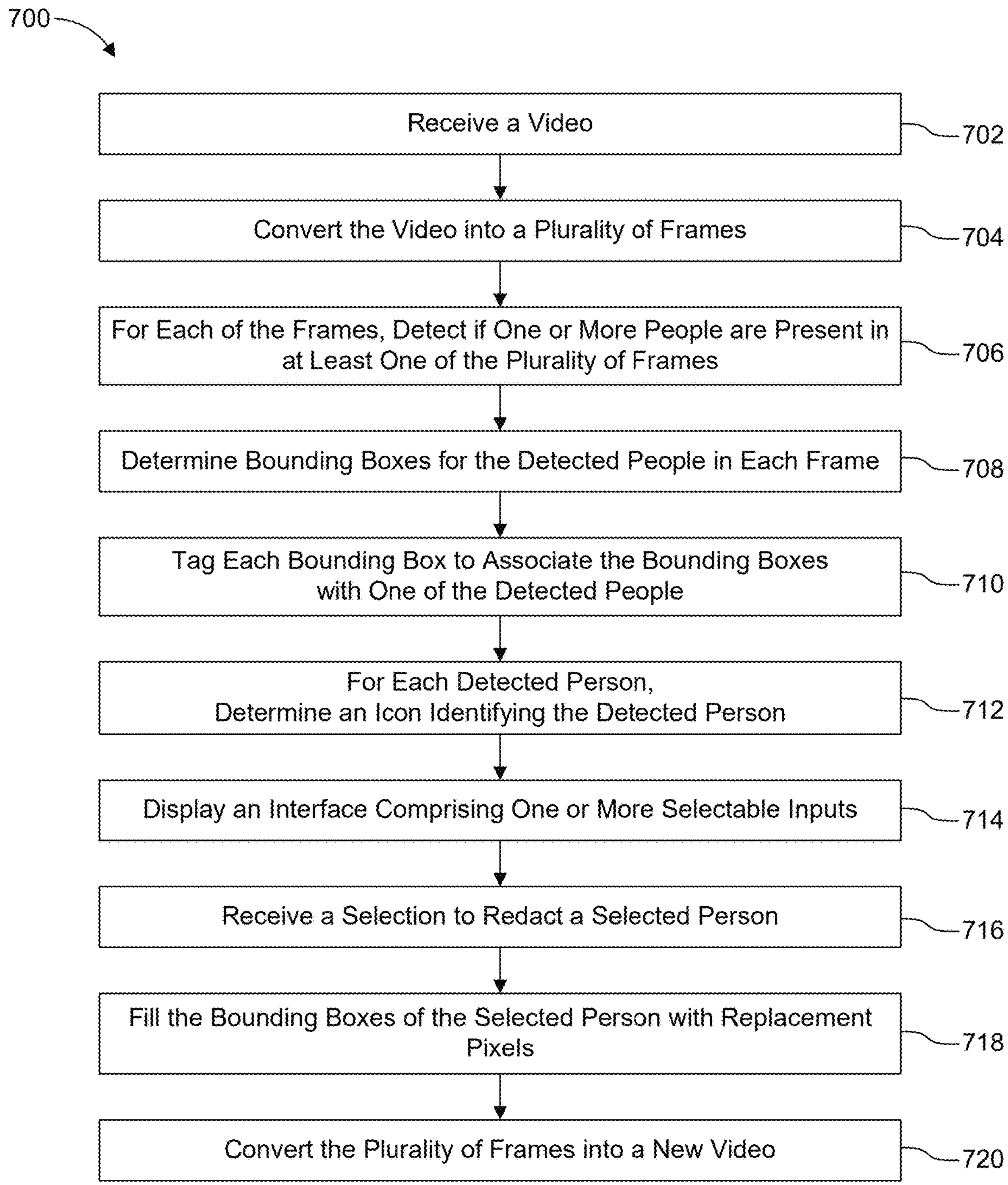
FIG. 7 illustrates a block diagram of a method for video redaction, according to an example embodiment.

FIG. 7 illustrates a block diagram of a method 700 for video redaction, according to an example embodiment. In an example, the method 700 is partially or wholly performed by one or more processors by executing instructions stored in memory. The method 700 begins at operation 702.

Operation 702 includes receiving a video. For example, the video redaction system 110 receives a video from the local device 102 or the remote device 104. The video can be manually or automatically provided. The video can be prepared for use, such as by converting the video into a desired format, size, bitrate, or other qualities. In some examples, the video may be received from storage as part of a security system. For instance, a security system may store surveillance footage from a variety of different cameras. The video can be maintained as security footage. The video may be obtained or received responsive to a request for personal information from a requestor. The request can contain information suitable for locating surveillance video containing the requestor. In some examples, the request includes an image of the requestor such that the requestor can be identified in the video by referencing the image. While in many examples, the requestor is the person both making the request for the video and the person in the video, that need not be the case. For instance, a person may request the video on behalf of someone else. In addition or instead, the requestor may request certain other objects to be removed or retained in the video. Following operation 702, the flow of the method 700 can move to operation 704.

Operation 704 includes converting the video into a plurality of frames. For example, the video processor 112 converts the video received in operation 702 into a plurality of frames and organizes the frames in sequential order. The conversion into the plurality of frames can be performed using any of a variety of techniques. Many different video playback devices or video processing libraries have capabilities that permit the creation of frames from a video file. Following operation 704, the flow of the method 700 can move to operation 706.

Operation 706 includes detecting objects of interest in each of the plurality of frames. In many examples, the objects of interest are people. For example, the detection processor 114 evaluates the plurality of frames to identify people present in each frame. In an example, idle background pixels or objects are subtracted from the frame to reveal candidate object of interest. Such objects can be grouped, such as according to contagious pixels or using blob detection. The resulting groups can be analyzed to determine whether the pixels of such groups are or include objects of interest. If so, the groups can be labeled in any of a variety of ways, such as by defining the coordinates of a bounding region (e.g., a smallest rectangle that contains all pixels of the group), by the coordinates of a centroid of the group, or by identifiers of the pixels that make up the group.

In some examples, objects of interest are detected by providing a frame (or one or more portions of a frame) as input into a machine learning model trained to detect objects of interest. For instance, human labelers can annotate frames as containing or not containing objects of interest (the labelers can also label the locations of the objects if any). Such annotated data can then be used as training data to train a machine learning model that can later be used in production. In some implementations, the detection of objects of interest can also produce one or more confidence levels. For instance, the confidence levels can describe confidence of an algorithm that a particular object actually is an object of interest or that particular pixels are part of the object of interest. Further, detecting objects of interest can include detecting subparts of the object of interest, such as determining whether and which pixels correspond to particular parts of an object (e.g., a person's face, arms, torso, legs, feet, etc.).

Following operation 706, the flow of the method 700 can move to operation 708.

In operation 708, bounding regions are determined for the detected objects in each frame. For example, the detection processor 114 determines the size of the detected people and sizes a bounding region to encapsulate each detected person in each frame. For instance, the bounding region can be sized to contain all pixels (or a threshold number) of pixels. In some instances, idle pixels can be subtracted from the bounding region or can be used to redraw the bounding region as a polygon that carves out some or all of the idle pixels. The size of the bounding regions can be based on an uncertainty value of the pixels to be contained within the bounding region. The determination of the size and configuration of the region can vary depending on parameters, such as the number of pixels of the object that the region must obscure (e.g., expressed in a percentage), the confidence level of the pixels that the region must obscure (e.g., what is the minimum confidence level before a pixel must be obscured), the kinds of object subparts that must be redacted or which may be unredacted (e.g., a parameter may specify that a person's face must always be redacted, but that it can be okay to not redact part of a foot), other parameters, or combinations thereof. Following operation 708, the flow of the method 700 can move to operation 710.

In operation 710, each bounding region is tagged or otherwise assigned a unique identifier to associate the bounding regions with one of the detected people. For example, the detection processor 114 assigns a detected person a tag in the first frame the detected person enters the view of the video, tracks the detected person in subsequent frames, and assigns the tag to the bounding regions assigned to the detected person based on the tracking.

The detection processor 114 can be configured to generate tags in any of a variety of ways or combinations thereof. In an example, the detection processor 114 assigns tags arbitrarily (e.g., pseudo randomly generated identifiers). The detection processor 114 can assign tags based on human-generated labels. The detection processor 114 can assign tags sequentially based on a number of people seen in a given time period. The detection processor 114 can assign tags based on a time or frame at which the person was first detected. The detection processor 114 can assign tags based on characteristics of the person. For instance, a bounding region corresponding to the person can be sent to an image-to-text processor (e.g., a machine learning model trained to take an image as input and provide text describing the image as output), the output of which can be used to tag the person. The resulting tags based on, for example, the person's clothing (e.g., person in a blue striped shirt), behavior (e.g., person walking down hallway) or both (e.g., person in green using ATM). The specificity of the tag can vary depending on the need for specificity to identify a person across frames. For instance, "hat" may be insufficient to identify a person if there are multiple people in that frame or set of frames that are wearing a hat, but "green hat" may be sufficiently descriptive. In some instances, the tag can be made up of a long-term identifier (e.g., a global identifier or a description of the appearance of the person) and additional information (e.g., what the person is doing behind the redaction). For instance, a tag for a person wearing a hat that appears at 1:46 p.m. on Jul. 27, 2023, walks up to the teller, performs a transaction, and then walks away might be assigned the following labels: "2023-07-27T13: 46:00-Hat: Walking", "2023-07-27T13: 46:00-Hat: Waiting", "2023-07-27T13: 46:00-Hat: Talking", "2023-07-27T13: 46:00-Hat: Walking". In some instances, the tag can be determined based on information by the requestor or about the object of interest. For instance, where the requestor indicates the object to be preserved (e.g., not redacted) is a person wearing particular clothes or having other particular characteristics, then individuals can be tagged according to those characteristics.

In certain instances, a tag for an individual can persist across time. For instance, a same person visible during each of a set of contiguous frames can be assigned a same tag or a same base tag (e.g., a global identifier). A same person being visible across discontinuous sets of fames from a same day can be assigned a same tag or same base tag if there is sufficiently high confidence that it is the same person (e.g., an algorithm configured to determine whether people are the same has an output that passes a predetermined threshold). A same person being visible across discontinuous sets of fames from different days can be assigned a same tag or same base tag if there is sufficiently high confidence that they are the same person.

Following operation 710, the flow of the method 700 can move to operation 712.

In operation 712, for each detected person, an icon is determined that identifies the detected person. For example, the detection processor 114 determines a frame that identifies the person (e.g., a frame that includes the person's face and/or other identifying features such as clothes). For instance, for each frame that includes the person (as determined above), image data within a bounding region corresponding to that individual is analyzed by a best-frame algorithm to compute a best-frame score, and the frame with the highest score is selected. The best-frame algorithm can be configured in any of ways, such as by identifying a frame of an individual that is most different from the frames of other individuals (e.g., a frame that is most likely to be distinct for that individual), a frame that includes a clearest view of the individual's face (e.g., using a face detection algorithm). The detection processor 114 may determine a portion of the frame to use as the icon (e.g., the portion of the frame defined by the bounding region associated with the detected person). The icon need not be a single still image. In some instances, the icon can be animated and show multiple different frames of the individual (e.g., the top n frames having the highest score). The icon can be a video file showing video content cropped to the individual (e.g., according to the bounding region). Following operation 712, the flow of the method 700 can move to operation 714.

In operation 714, one or more objects are selected for redaction. In an example, user input is received that identifies one or more objects for redaction or one or more objects to not be redacted. In an example, a system can load a policy that defines objects to remove (e.g., license plates, text, faces, etc.).

In an example, an object is selected for redaction if the object does not meet a description of the requestor (or an object of interest specified by the requestor) of the redacted video. For instance, a requestor may ask for video taken while they are at a bank walking up to the teller and depositing a check. The requestor may provide an image of themself in addition to or instead of a description of the clothing that they were wearing that day: a blue hat, a white T-shirt, blue jeans, and brown shoes. The person meeting that description in the video (e.g., manually by a person, automatically by a machine learning model trained to select individuals based on descriptions, or by using the generated tags) can be determined and then all other people are selected for removing. In addition or instead, all individuals not meeting that description (e.g., anyone not wearing a blue hat, anyone not wearing a white shirt, anyone not wearing a T-shirt, etc.) are marked as candidates for redaction.

In an example, the one or more objects are selected via an interface that is displayed comprising one or more selectable inputs. For example, the video redaction system 110 displays an interface with one or more selectable inputs that include the icons determined in operation 712. The selectable inputs are selectable to select the detected persons associated with the icons to be kept in the video or redacted. Following operation 714, the flow of the method 700 can move to operation 716.

In operation 716, a selection is received to redact one or more selected people. For example, the video redaction system 110 receives a selection to redact a selected person via the interface displayed in operation 714. The video redaction system 110 can further receive information regarding how to redact the selected people. The further information can include how to redact the people, a level of confidence that should be reached prior to redaction, other parameters, and combinations thereof. Following operation 716, the flow of the method can move to operation 718.

In operation 718, the bounding regions are used for redaction. For instance, the bounding regions of the selected person are filled with replacement pixels. For example, the redaction processor 116 replaces the pixels of the bounding regions of each frame that are associated with the selected person. The redaction processor 116 may replace the pixels with pixels of uniform color or with idle pixels from the background of the frames.

In some implementations, idle pixels can be used to redact objects of interest and leave idle objects visible. For instance, the redaction processor 116 (alone or with the help of another processor herein), may be configured to redact only non-idle pixels. In other words, the redaction processor 116 can skip replacing idle pixels with the replacement pixels. As a specific example, the object of interest may be a person with part of their body being obscured by an idle foreground object (e.g., teller window, table, plant, or another foreground object). In addition or instead, even if the person's body is not obscured by the idle foreground object, the person's bounding region may still cover at least a portion of the idle foreground object. In certain instances, redacting an entire bounding region of an object may also redact the foreground object. Instead, the redaction processor 116 may be configured to redact those non-idle pixels and leave the idle object visible. For instance, during redaction, the redaction processor 116 can determine whether each pixel candidate for redaction passes an idle pixel threshold (e.g., based on a difference between that candidate pixel and a known idle pixel). If so, then the pixel is not redacted.

While the redaction processor 116 may redact objects by painting them in a same color, in other instances, it can be beneficial to color paint different objects in different colors or patterns (e.g., based on a predetermined palette of colors or patterns) such that an observer can tell objects apart while preserving privacy. In other instances, rather than painting the object, the redaction processor 116 can blur the object by applying a blurring function, add noise to the region, apply other effects, or combinations thereof.

In some instances, the redaction processor 116 may redact objects by replacing an object with one that do not exist. For instance, a generative artificial intelligence model can be used to replace the object of interest with a synthetic person using known libraries or techniques (often referred to as "deepfakes").

In some instances, the redaction processor 116 can apply an encryption algorithm to encrypt the pixels of the object being obscured. For instance, the pixels within the bounding region in the given frame are encrypted and the resulting encrypted information is then converted into a form storable and detectable within the frame. The encrypted information can then be extracted and decoded with an appropriate encryption key. The resulting decrypted information can then be filled into the bounding region. Where the encrypted information requires more storage than would be possible to fit within the pixels of the bounding region, the encrypted information can be stored within the frame using a steganographic technique. In addition or instead, some or all of the encrypted information is stored in one or more companion files stored with the video file. Each object of interest can be associated with a different encryption key that is securely stored. The redaction processor 116 can apply the encryption such that the pixels of the same object are decryptable in different frames using a same encryption key for convenience. In this manner, the privacy of each object is preserved while still being able to be selectively revealed through a secure process if necessary.

In some instances, this encrypted redaction can be used to preserve privacy while maintaining the ability to review security footage later while preserving privacy. For instance, an individual may request that they be removed from the security footage. They can be identified and replaced with encrypted data. That redacted video can replace an original video in a security system (e.g., the redacted video can be maintained as security footage). The key to decrypt that security footage can be stored by someone for later decryption. For instance, the key can be stored by a party other than the maintainer of security footage. The key may be stored in escrow such that the maintainer of the security footage cannot decrypt the encrypted portion of the footage without, for example, permission of the redacted individual, an order by a court, a compelling reason, other reasons, or combinations thereof. In some examples, the key is created in part or in whole by the individual requesting redaction or the escrowing party.

In some examples, redaction includes removing frames that do or do not contain an object of interest. For instance, if an individual requests surveillance footage that they are in, that individual may walk in and out of the view of a camera. Frames in which they are out of the view of the camera can be removed from the redacted video.

Following operation 718, the flow of the method can move to operation 720. In operation 720, the plurality of frames are converted into a new video. For example, the video processor 112 converts the frames, including the frames with the redacted pixels, into a new video. Thus, the new video has the selected person redacted. The redacted video can be provided to a requestor. The redacted video can be stored in addition to the original video. The redacted video can overwrite the original video. The original video can persist after the creation of the redacted video. The providing of the redacted video can fulfill the request.

One or more aspects described herein can be implemented with a computing environment. A computing environment is a set of one or more virtual or physical computers that cause output based on input. Example computers include desktop computers, servers, mobile computing devices, wearable computing devices, virtualized computing devices, other computers, or combinations thereof. Many example computers include one or more processors, memory, and one or more interfaces.

The one or more processors are collections of one or more virtual or physical components that are configured to provide output in response to input. In many examples, the one or more processors are so configured by obtaining and executing instructions (e.g., stored in the memory) and using data (e.g., also stored in the memory). The one or more processors can take any of a variety of forms, such as central processing units (e.g., those provided by INTEL, AMD, QUALCOMM, or APPLE), graphics processing units (e.g., those provided by INTEL, AMD, NVIDIA, QUALCOMM, or APPLE), coprocessors, tensor processing units, artificial intelligence accelerators, microcontrollers, microprocessors, other forms, or combinations thereof. In some examples, the one or more processors are so configured through specifically designed hardware. Examples of such processors include application-specific integrated circuits, field programmable gate arrays, other processors, or combinations thereof.

The memory is a collection of one or more virtual or physical components configured to store instructions or data for later retrieval and use. In many examples, the memory is a non-transitory computer readable medium, though in certain circumstances the memory can be transitory. Examples of transitory memory include data encoded into transient signals. Examples of non-transitory memory include random access memory, cache memory (e.g., which may be incorporated into the one or more processors), read only memory (including EPROM and EEPROM), optical memory, magnetic memory, solid state memory, other memory, or combinations thereof. In some examples, the memory can be configured to be portable, such as enclosed hard drives, thumb drives, CD-ROM disks, DVDs, BLU-RAY disks, other media, or combinations thereof. In some examples, the memory can be incorporated with the one or more processors (e.g., via registers or cache memory).

The one or more interfaces are one or more virtual or physical components by which the computing environment can receive input or provide output. Example interfaces for providing output include one or more visual output components (e.g., displays or lights), auditory output components (e.g., speakers), haptic output components (e.g., vibratory components), other output components, or combinations thereof. Example interfaces for receiving input include one or more visual input components (e.g., still cameras, video cameras, optical sensors), auditory input components (e.g., microphones), haptic input components (e.g., touch or vibration sensitive components), motion input components (e.g., mice, gesture input controllers, or movement sensors), buttons (e.g., keyboards or mouse buttons), position sensors (e.g., terrestrial or satellite-based position sensors such as via the Global Positioning System) other input components, or combinations thereof. The one or more interfaces can include components for sending or receiving data from other computing environments or devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols).

One or more of the one or more interfaces can facilitate connection of the computing environment to a network. The network can be a set of one or more other computing devices or environments. Example networks include local area networks, wide area networks, or the Internet.

The environment and its one or more physical computers can include any of a variety of other components to facilitate performance of operations described herein. Example components include one or more power units (e.g., batteries, capacitors, or power harvesters) that provide operational power, one or more busses to provide intra-device communication, one or more cases or housings to encase one or more components, other components, or combinations thereof.

In some instances, the computing device or the environment can be a general-purpose computing device or environment. They may be constructed from one or more consumer or off-the-shelf components. In some instances, via hardware or software configuration, the computing device or the environment can be a special purpose computing device. The one or more computing devices or computing environments can individually or in cooperation to perform operations described herein.

A person of skill in the art, having benefit of this disclosure, may recognize various ways for implementing technology described herein. The person of skill in the art may use any of a variety of programming languages (e.g., a C-family programming language, PYTHON, JAVA, RUST, HASKELL, other languages, or combinations thereof) and libraries (e.g., libraries that provide functions for obtaining, processing, and presenting data). Example libraries include NLTK by Team NLTK (which provides natural language functionality), PYTORCH by META (which provides machine learning functionality), and NUMPY by the NUMPY Developers (which provides mathematical functions), among others. Operating systems (e.g., WINDOWS or LINUX based operating systems) may provide their own libraries or application programming interfaces useful for implementing aspects described herein. A person of skill in the art, with the benefit of the disclosure herein, can use programming tools to assist in the creation of software or hardware to achieve techniques described herein. Such tools can include intelligent code completion tools (e.g., INTELLISENSE), artificial intelligence tools (e.g., GITHUB COPILOT).

A person of skill in the art with the benefit of disclosures herein can use any of a variety of known techniques to implement aspects described herein. For instance, a person of skill in the art may use image or video processing libraries, such as OPENCV by the OPENCV, VLC media player by VIDEOLAN, and FFMPEG by the FFMPEG community to implement detection, segmentation, or frame modification. A person of skill in the art may use the Segment Anything Model by META AI to perform object detection or segmentation according to aspects described herein.

One or more techniques described herein can benefit from or be implemented using a machine learning framework. A machine learning framework is a collection of software and data that implements artificial intelligence trained to provide output based on input. Examples of artificial intelligence include neural networks (including recurrent neural networks), language models, generative models, natural language processing models, adversarial networks, decision trees, Markov models, support vector machines, genetic algorithms, others, or combinations thereof. Machine learning frameworks or components thereof are often built or refined from existing frameworks, such as TENSORFLOW by GOOGLE, INC. or PYTORCH by the PYTORCH community.

Where implementations involve personal data, that personal data can be stored in a manner consistent with relevant laws and with a defined privacy policy. Where possible, the data can be anonymized or fuzzed to reduce the amount of accurate personal data that is unnecessarily stored. The data can be stored in accordance with a classification system that reflects the level of sensitivity of the data and that encourages human or computer handlers to treat the data with a commensurate level of care.

Where implementations involve machine learning, machine learning be used according to a defined machine learning policy. Such policy may encourage training of the model with a diverse set of training data. Further, the policy can encourage testing for and correcting undesirable bias embodied in the machine learning model. The machine learning model can further be aligned such that the machine learning model tends to produce output consistent with a predetermined morality.

Various embodiments are described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Various modifications and additions can be made to the exemplary examples discussed without departing from the scope of the present invention. For example, while the examples described above refer to particular features, the scope of this invention also includes examples having different combinations of features and examples that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and such references mean at least one of the examples.

Reference to "one example" or "an example" means that a particular feature, structure, or characteristic described in connection with the example is included in at least one example of the disclosure. The appearances of the phrase "in one example" in various places in the specification are not necessarily all referring to the same example, nor are separate or alternative examples mutually exclusive of other examples. Moreover, various features are described which may be exhibited by some examples and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various examples given in this specification.

Without intent to limit the scope of the disclosure, examples of instruments, apparatus, methods, and their related results according to the examples of the present disclosure are given above. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

What is claimed is:

1. A method for forming a redacted video comprising:
detecting one or more subjects present in a video;
determining a subject of the one or more subjects to redact from the video;
determining bounding regions for the subject for each frame of the video the subject is present, wherein determining the bounding regions comprises:
determining uncertainty values for the bounding regions, wherein the uncertainty values are related to a level of uncertainty regarding a position of the subject, and
sizing or resizing the bounding regions based on the uncertainty values; and
forming a redacted video by redacting the subject from the video using the bounding regions.

2. The method of claim 1, wherein redacting the subject from the video comprises redacting portions of the video defined by the bounding regions.

3. The method of claim 1, wherein determining the bounding regions for the subject is further based on an expected velocity of the subject or a prior position of a prior bounding region associated with the subject.

4. The method of claim 1, wherein determining the subject of the one or more subjects to redact from the video is based on receiving a selection of the subject.

5. The method of claim 4, wherein receiving the selection comprises:
for each of the one or more subjects, determining an identifying icon; and
providing an interface comprising one or more selectable elements, wherein each selectable element:
has an associated subject of the one or more subjects,
includes the identifying icon of the associated subject, and
is selectable to include or exclude the associated subject from the video.

6. The method of claim 1, wherein redacting the subject from the video comprises inserting replacement pixels.

7. The method of claim 6, wherein the replacement pixels convey encrypted data.

8. The method of claim 6, wherein the replacement pixels comprise idle pixels from a background of the video.

9. A method for forming a redacted video comprising:
detecting one or more subjects present in a video;

determining a subject of the one or more subjects to redact from the video;

determining bounding regions for the subject for each frame of the video the subject is present, wherein determining the bounding regions is based on any one of (i) uncertainty values regarding uncertainty of a position of the subject, (ii) an expected velocity of the subject; (iii) a prior position of a prior bounding region associated with the subject, or (iv) any combination of (i)-(iii); and forming a redacted video by redacting the subject from the video using the bounding regions.

10. The method of claim 9, wherein redacting the subject from the video comprises redacting portions of the video defined by the bounding regions.

11. The method of claim 9, wherein determining the subject of the one or more subjects to redact from the video is based on receiving a selection of the subject.

12. The method of claim 11, wherein receiving the selection comprises:

for each of the one or more subjects, determining an identifying icon; and providing an interface comprising one or more selectable elements, wherein each selectable element:

has an associated subject of the one or more subjects, includes the identifying icon of the associated subject, and is selectable to include or exclude the associated subject from the video.

13. The method of claim 9, wherein redacting the subject from the video comprises inserting replacement pixels.

14. The method of claim 13, wherein the replacement pixels convey encrypted data.

15. The method of claim 13, wherein the replacement pixels comprise idle pixels from a background of the video.

16. A non-transitory computer readable medium having a redacted video stored thereon, the redacted video having been produced by a method comprising:

detecting one or more subjects present in a video;

determining a subject of the one or more subjects to redact from the video;

determining bounding regions for the subject for each frame of the video the subject is present, wherein determining the bounding regions comprises:

determining uncertainty values for the bounding regions, wherein the uncertainty values are related to a level of uncertainty regarding a position of the subject, and sizing or resizing the bounding regions based on the uncertainty values; and forming a redacted video by redacting the subject from the video using the bounding regions.

17. The non-transitory computer readable medium of claim 16, wherein redacting the subject from the video comprises redacting portions of the video defined by the bounding regions.

18. The non-transitory computer readable medium of claim 16, wherein determining the bounding regions for the subject is further based on an expected velocity of the subject or a prior position of a prior bounding region associated with the subject.

19. The non-transitory computer readable medium of claim 16, wherein determining the subject of the one or more subjects to redact from the video is based on receiving a selection of the subject, receiving the selection comprising:

for each of the one or more subjects, determining an identifying icon; and providing an interface comprising one or more selectable elements, wherein each selectable element:

has an associated subject of the one or more subjects, includes the identifying icon of the associated subject, and is selectable to include or exclude the associated subject from the video.

20. The non-transitory computer readable medium of claim 16, wherein redacting the subject from the video comprises inserting replacement pixels.

* * * * *